United States Patent
Prakash et al.

(10) Patent No.: US 8,107,421 B2
(45) Date of Patent: Jan. 31, 2012

(54) METHOD AND APPARATUS FOR REQUESTING PILOTREPORT IN WIRELESS COMMUNICATION SYSTEMS

(75) Inventors: Rajat Prakash, San Diego, CA (US); Fatih Ulupinar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 777 days.

(21) Appl. No.: 12/091,450

(22) PCT Filed: Oct. 27, 2006

(86) PCT No.: PCT/US2006/042260
§ 371 (c)(1),
(2), (4) Date: Oct. 15, 2008

(87) PCT Pub. No.: WO2007/050996
PCT Pub. Date: May 3, 2007

(65) Prior Publication Data
US 2009/0086665 A1    Apr. 2, 2009

Related U.S. Application Data

(60) Provisional application No. 60/731,126, filed on Oct. 27, 2005.

(51) Int. Cl.
*G06F 15/16* (2006.01)
(52) U.S. Cl. .......................... 370/328; 370/331; 370/338
(58) Field of Classification Search .................... 370/328
See application file for complete search history.

(56) References Cited

U.S. PATENT DOCUMENTS

| | | | |
|---|---|---|---|
| 7,987,505 B2 * | 7/2011 | Vadlapudi et al. | 726/14 |
| 8,000,257 B2 * | 8/2011 | An et al. | 370/252 |
| 2008/0271138 A1 * | 10/2008 | Chen et al. | 726/17 |
| 2009/0258648 A1 * | 10/2009 | Willey | 455/435.1 |
| 2010/0034101 A1 * | 2/2010 | Ayman Naguib | 370/252 |

FOREIGN PATENT DOCUMENTS

WO     WO 02/28120 A2     4/2002
WO     WO 2004/100450 A1   11/2004

OTHER PUBLICATIONS

Office Action dated May 6, 2011, for Chinese Patent Application No. 200680049640.5, 5 pages.
JP Office Action mailed Jan. 11, 2011 for Japanese Patent Application No. 2008-538069, 3 pages.
CN Office Action mailed Jan. 6, 2011 for Chinese Patent Application No. 200680049640.5, 5 pages.
3GPP2 C: "cdma2000 High Rate Packet Data Air Interface Specification; 3GPP2 C.S0024-A version 2.0,"3GPP2 CDMA2000, Jul. 2005, p. 0, 8-98,8-106, 8-120-8-121, XP002427172.

(Continued)

*Primary Examiner* — Jeffrey Pwu
*Assistant Examiner* — Sulaiman Nooristany
(74) *Attorney, Agent, or Firm* — Turocy & Watson, LLP

(57) ABSTRACT

A method and apparatus for transmitting PilotReportRequest message in a wireless communication system is described. A PilotReportRequest message comprising an 8 bit MessageID field and an 8 bit ReportFormat field is generated, wherein the ReportFormat field indicates the format of the PilotReport being requested from an access terminal. The PilotReportRequest message is transmitted over a communication link.

6 Claims, 8 Drawing Sheets

OTHER PUBLICATIONS

3GPP2 C: "cdma2000 High Rate Packet Data Air Interface Specification; 3GPP2 C.S0024-A version 1. 0,"3GPP2, Mar. 2004, p. 0,9-85, XP002427173.
Tomcik J et al: "QFDD and QTDD: Proposed Draft Air Interface Specification, chapter 6, Lower MAC Control Sublayer"IEEE C802. 20-05/69, XX, XX, Oct. 28, 2005, pp. I-XXXI,I, XP002423447.
CDMA 2000 High Rate Packet Data Air Interface Specification, 3GPP2 C. S0024-A v2. (Jul. 2005).

Office Action mailed Mar. 10, 2010 for Korean Patent Application No. 2008-7012468, 3 pages.
International Search Report & Written Opinion mailed Apr. 16, 2007 for PCT Application No. PCT/US2006/042260, 13 pages.
JP Office Action dated Aug. 2, 2011, for Japanese Patent Application No. 2008-538069, 2 pages.

* cited by examiner

METHOD AND APPARATUS FOR REQUESTING PILOTREPORT IN WIRELESS COMMUNICATION SYSTEMS

CLAIM OF PRIORITY UNDER 35 U.S.C. §119

The present Application for Patent claims priority to Provisional Application Ser. No. 60/731,126 entitled "METHODS AND APPARATUS FOR PROVIDING MOBILE BROADBAND WIRELESS LOWER MAC", filed Oct. 27, 2005, assigned to the assignee hereof, and expressly incorporated herein by reference.

BACKGROUND

1. Field

The present disclosure relates generally to wireless communications, and more particularly to methods and apparatus for requesting a PilotReport.

2. Background

Wireless communication systems have become a prevalent means by which a majority of people worldwide have come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

Wireless communication systems generally utilize different approaches to generate transmission resources in the form of channels. These systems may be code division multiplexing (CDM) systems, frequency division multiplexing (FDM) systems, and time division multiplexing (TDM) systems. One commonly utilized variant of FDM is orthogonal frequency division multiplexing (OFDM) that effectively partitions the overall system bandwidth into multiple orthogonal subcarriers. These subcarriers may also be referred to as tones, bins, and frequency channels. Each subcarrier can be modulated with data. With time division based techniques, each subcarrier can comprise a portion of sequential time slices or time slots. Each user may be provided with a one or more time slot and subcarrier combinations for transmitting and receiving information in a defined burst period or frame. The hopping schemes may generally be a symbol rate hopping scheme or a block hopping scheme.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and/or code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams transmitted from the base station. Likewise, a mobile terminal can transmit data to the base station or another mobile terminal. In these systems the bandwidth and other system resources are assigned utilizing a scheduler.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

The signals, signal formats, signal exchanges, methods, processes, and techniques disclosed herein provide several advantages over known approaches. These include, for example, reduced signaling overhead, improved system throughput, increased signaling flexibility, reduced information processing, reduced transmission bandwidth, reduced bit processing, increased robustness, improved efficiency, and reduced transmission power.

According to an embodiment, a method is provided for transmitting PilotReportRequest message in a wireless communication system, the method comprising generating a PilotReportRequest message comprising an 8 bit MessageID field and an 8 bit ReportFormat field wherein the ReportFormat field indicates the format of the PilotReport being requested from an access terminal and transmitting the PilotReportRequest message over a communication link.

According to another embodiment, a computer readable medium is described having a first set of instructions for generating a PilotReportRequest message comprising an 8 bit MessageID field and an 8 bit ReportFormat field wherein the ReportFormat field indicates the format of the PilotReport being requested from an access terminal and a second set of instructions for transmitting the PilotReportRequest message over a communication link.

According to yet another embodiment, an apparatus operable in a wireless communication system is described which includes means for generating a PilotReportRequest message comprising an 8 bit MessageID field and an 8 bit ReportFormat field wherein the ReportFormat field indicates the format of the PilotReport being requested from an access terminal and means for transmitting the PilotReportRequest message over a communication link.

According to yet another embodiment, a method is provided for providing information the method comprising receiving a PilotReportRequest message comprising an 8 bit MessageID field and an 8 bit ReportFormat field wherein the ReportFormat field indicates the format of the PilotReport being requested from an access terminal and responding with a PilotReport message.

According to yet another embodiment, a computer readable medium is described having a first set of instructions for receiving a PilotReportRequest message comprising an 8 bit MessageID field and an 8 bit ReportFormat field wherein the ReportFormat field indicates the format of the PilotReport being requested from an access terminal and a second set of instructions for responding with a PilotReport message.

According to yet another embodiment, an apparatus operable in a wireless communication system is described which includes means for receiving a PilotReportRequest message comprising an 8 bit MessageID field and an 8 bit ReportFormat field wherein the ReportFormat field indicates the format of the PilotReport being requested from an access terminal and means for responding with a PilotReport message.

To the accomplishment of the foregoing and related ends, the one or more embodiments comprise the features hereinafter fully described and particularly pointed out in the claims. The following description and the annexed drawings set forth in detail certain illustrative embodiments of the one or more embodiments. These embodiments are indicative, however, of but a few of the various ways in which the principles of various embodiments may be employed and the described embodiments are intended to include all such embodiments and their equivalents.

DETAILED DESCRIPTION

Figure 1:
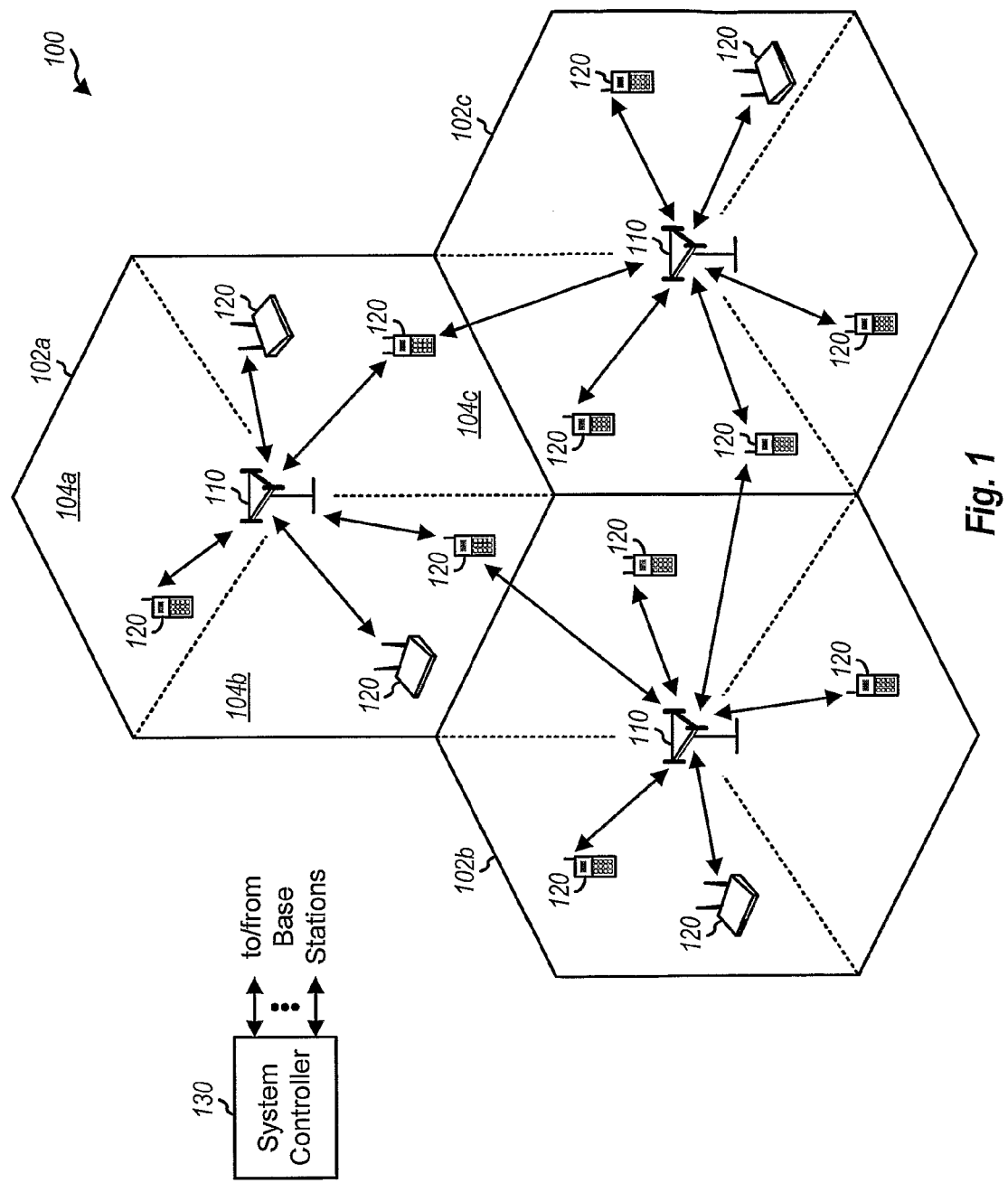
FIG. 1 illustrates embodiments of a multiple access wireless communication system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Referring to FIG. 1, a multiple access wireless communication system according to one embodiment is illustrated. A multiple access wireless communication system 100 includes multiple cells, e.g. cells 102, 104, and 106. In the embodiment of FIG. 1, each cell 102, 104, and 106 may include an access point 150 that includes multiple sectors. The multiple sectors are formed by groups of antennas each responsible for communication with access terminals in a portion of the cell. In cell 102, antenna groups 112, 114, and 116 each correspond to a different sector. In cell 104, antenna groups 118, 120, and 122 each correspond to a different sector. In cell 106, antenna groups 124, 126, and 128 each correspond to a different sector.

Each cell includes several access terminals which are in communication with one or more sectors of each access point. For example, access terminals 130 and 132 are in communication base 142, access terminals 134 and 136 are in communication with access point 144, and access terminals 138 and 140 are in communication with access point 146.

Controller 130 is coupled to each of the cells 102, 104, and 106. Controller 130 may contain one or more connections to multiple networks, e.g. the Internet, other packet based networks, or circuit switched voice networks that provide information to, and from, the access terminals in communication with the cells of the multiple access wireless communication system 100. The controller 130 includes, or is coupled with, a scheduler that schedules transmission from and to access terminals. In other embodiments, the scheduler may reside in each individual cell, each sector of a cell, or a combination thereof.

As used herein, an access point may be a fixed station used for communicating with the terminals and may also be referred to as, and include some or all the functionality of, a base station, a Node B, or some other terminology. An access terminal may also be referred to as, and include some or all the functionality of, a user equipment (UE), a wireless communication device, terminal, a mobile station or some other terminology.

It should be noted that while FIG. 1, depicts physical sectors, i.e. having different antenna groups for different sectors, other approaches may be utilized. For example, utilizing multiple fixed "beams" that each cover different areas of the cell in frequency space may be utilized in lieu of, or in combination with physical sectors. Such an approach is depicted and disclosed in copending U.S. patent application Ser. No. 11/260,895, entitled "Adaptive Sectorization In Cellular System."

Figure 2:
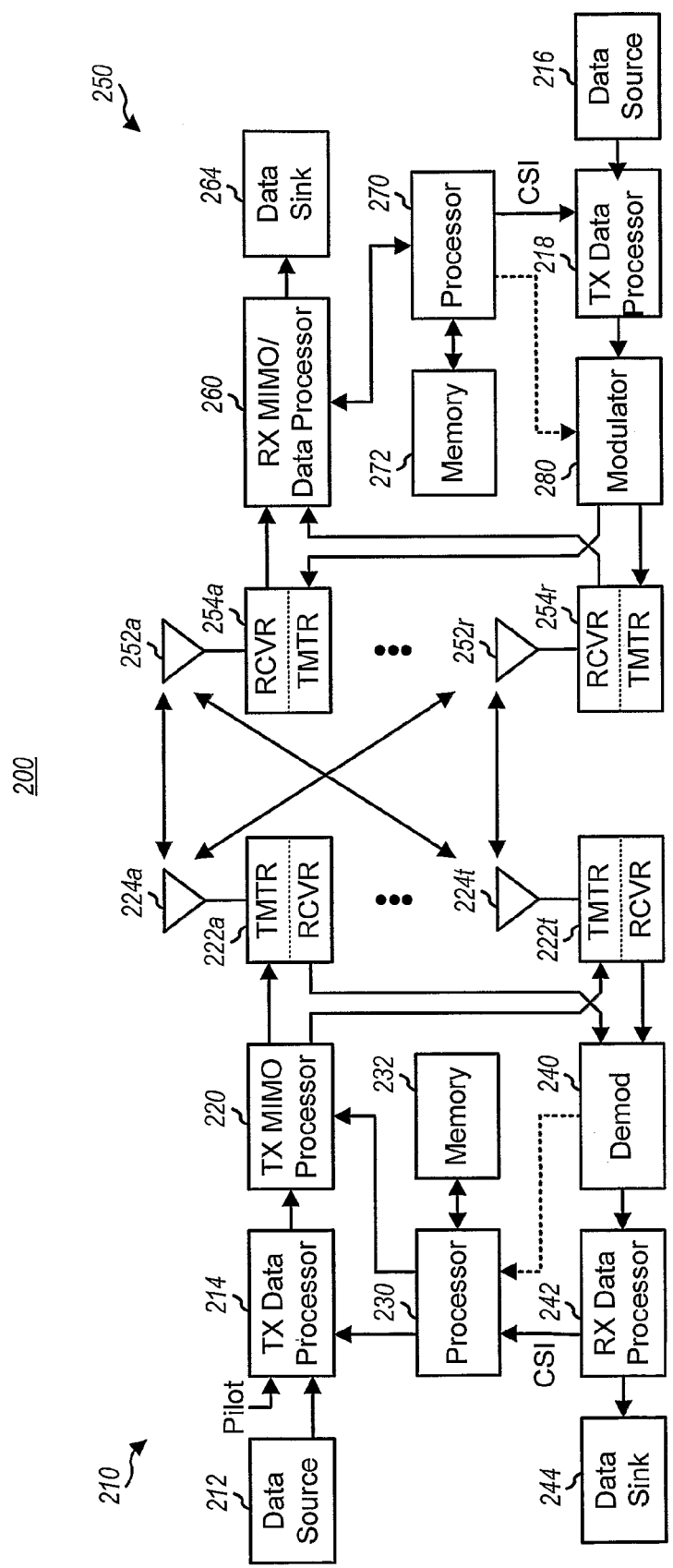
FIG. 2 illustrates embodiments of a transmitter and receiver in a multiple access wireless communication system.

Referring to FIG. 2, a block diagram of an embodiment of a transmitter system 210 and a receiver system 250 in a MIMO system 200 is illustrated. At transmitter system 210, traffic data for a number of data streams is provided from a data source 212 to transmit (TX) data processor 214. In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM, or other orthogonalization or non-orthogonalization techniques. The pilot data is typically a known data pattern that is processed in a known manner and may be used at the receiver system to estimate the channel response. The multiplexed pilot and coded data for each data stream is then modulated (i.e., symbol mapped) based on one or more particular modulation schemes (e.g., BPSK, QSPK, M-PSK, or M-QAM) selected for that data stream to provide modulation symbols. The data rate, coding, and modulation for each data stream may be determined by instructions performed on provided by processor 230.

The modulation symbols for all data streams are then provided to a TX processor 220, which may further process the modulation symbols (e.g., for OFDM). TX processor 220 then provides $N_T$ modulation symbol streams to $N_T$ transmitters (TMTR) 222a through 222t. Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The processing by RX data processor 260 is described in further detail below. Each detected symbol stream includes symbols that are estimates of the modulation symbols transmitted for the corresponding data stream. RX data processor 260 then demodulates, deinterleaves, and decodes each detected symbol stream to recover the traffic data for the data stream. The processing by RX data processor 218 is complementary to that performed by TX processor 220 and TX data processor 214 at transmitter system 210.

RX data processor 260 may be limited in the number of subcarriers that it may simultaneously demodulate, e.g. 512 subcarriers or 5 MHz, and such a receiver should be scheduled on a single carrier. This limitation may be a function of its FFT range, e.g. sample rates at which the processor 260 may operate, the memory available for FFT, or other functions available for demodulation. Further, the greater the number of subcarriers utilized, the greater the expense of the access terminal.

The channel response estimate generated by RX processor 260 may be used to perform space, space/time processing at the receiver, adjust power levels, change modulation rates or schemes, or other actions. RX processor 260 may further estimate the signal-to-noise-and-interference ratios (SNRs) of the detected symbol streams, and possibly other channel characteristics, and provides these quantities to a processor 270. RX data processor 260 or processor 270 may further derive an estimate of the "operating" SNR for the system. Processor 270 then provides channel state information (CSI), which may comprise various types of information regarding the communication link and/or the received data stream. For example, the CSI may comprise only the operating SNR. In other embodiments, the CSI may comprise a channel quality indicator (CQI), which may be a numerical value indicative of one or more channel conditions. The CSI is then processed by a TX data processor 278, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to recover the CSI reported by the receiver system. The reported CSI is then provided to processor 230 and used to (1) determine the data rates and coding and modulation schemes to be used for the data streams and (2) generate various controls for TX data processor 214 and TX processor 220. Alternatively, the CSI may be utilized by processor 270 to determine modulation schemes and/or coding rates for transmission, along with other information. This may then be provided to the transmitter which uses this information, which may be quantized, to provide later transmissions to the receiver.

Processors 230 and 270 direct the operation at the transmitter and receiver systems, respectively. Memories 232 and 272 provide storage for program codes and data used by processors 230 and 270, respectively.

At the receiver, various processing techniques may be used to process the $N_R$ received signals to detect the $N_T$ transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

While FIG. 2 discusses a MIMO system, the same system may be applied to a multi-input single-output system where multiple transmit antennas, e.g. those on a base station, transmit one or more symbol streams to a single antenna device, e.g. a mobile station. Also, a single output to single input antenna system may be utilized in the same manner as described with respect to FIG. 2.

The transmission techniques described herein may be implemented by various means. For example, these techniques may be implemented in hardware, firmware, software, or a combination thereof. For a hardware implementation, the processing units at a transmitter may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units at a receiver may also be implemented within one or more ASICs, DSPs, processors, and so on.

For a software implementation, the transmission techniques may be implemented with processors (e.g., procedures, functions, and so on) that perform the functions described herein. The software codes may be stored in a memory (e.g., memory 230, 272x or 272y in FIG. 2) and executed by a processor (e.g., processor 232, 270x or 270y). The memory may be implemented within the processor or external to the processor.

It should be noted that the concept of channels herein refers to information or transmission types that may be transmitted by the access point or access terminal. It does not require or utilize fixed or predetermined blocks of subcarriers, time periods, or other resources dedicated to such transmissions.

Figure 3A:
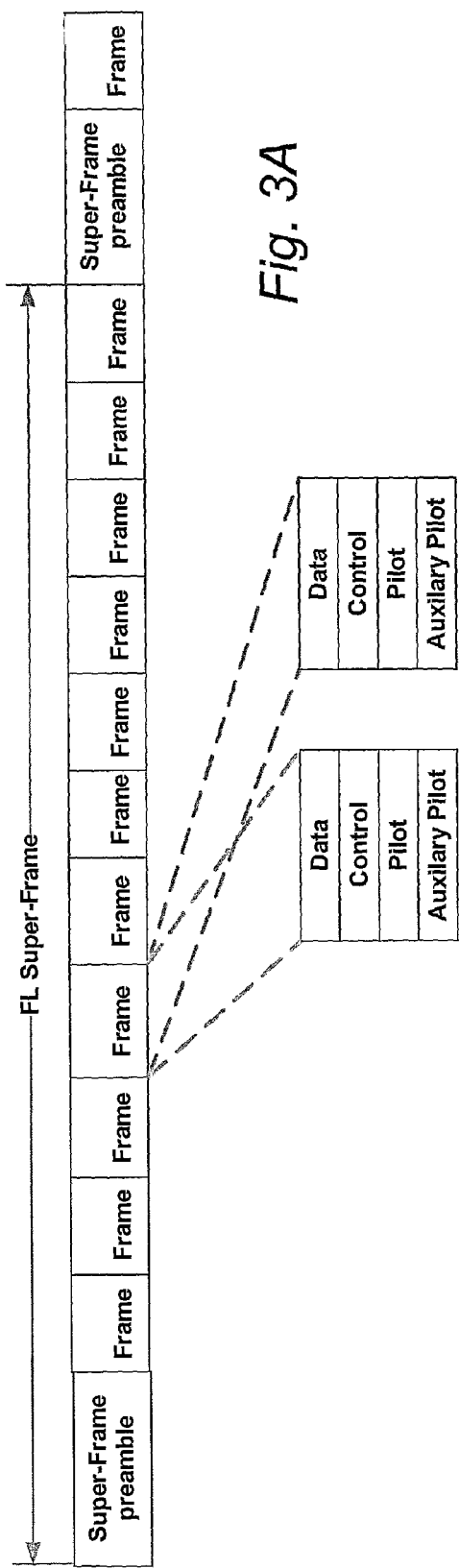
FIGS. 3A and 3B illustrate embodiments of superframe structures for a multiple access wireless communication system.
Figure 3B:
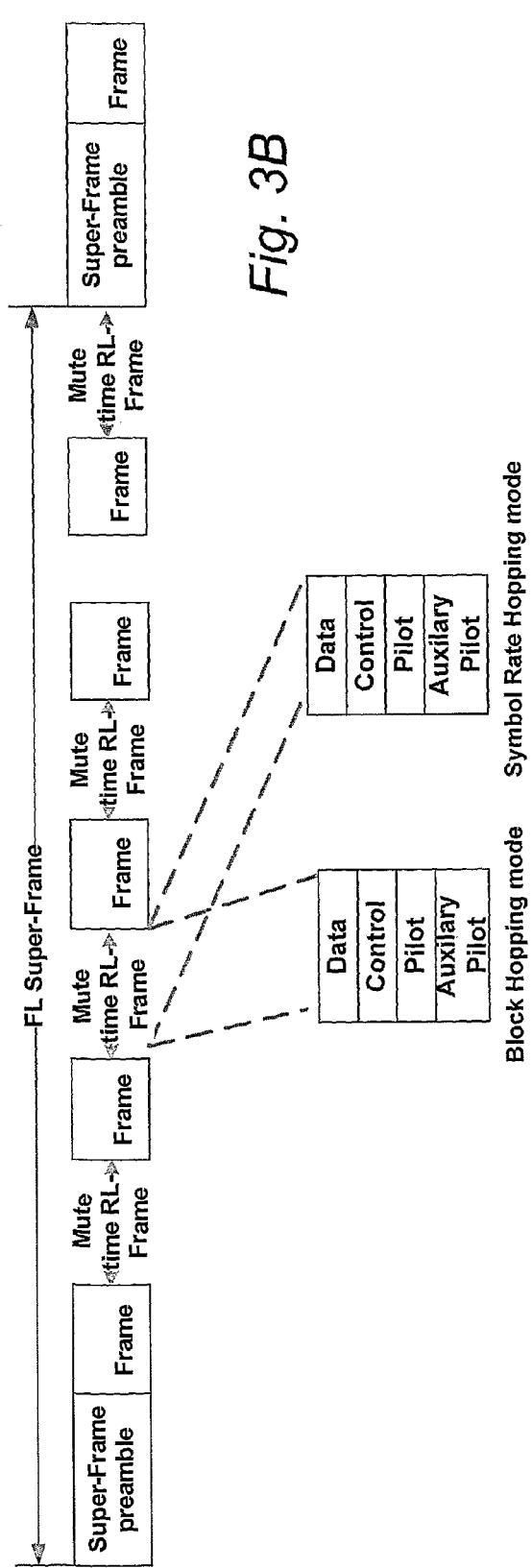

Referring to FIGS. 3A and 3B, embodiments of superframe structures for a multiple access wireless communication system are illustrated. FIG. 3A illustrates embodiments of superframe structures for a frequency division duplexed (FDD) multiple access wireless communication system, while FIG. 3B illustrates embodiments of superframe structures for a time division duplexed (TDD) multiple access wireless communication system. The superframe preamble may be transmitted separately for each carrier or may span all of the carriers of the sector.

In both FIGS. 3A and 3B, the forward link transmission is divided into units of superframes. A superframe may consist of a superframe preamble followed by a series of frames. In an FDD system, the reverse link and the forward link transmission may occupy different frequency bandwidths so that transmissions on the links do not, or for the most part do not, overlap on any frequency subcarriers. In a TDD system, N forward link frames and M reverse link frames define the number of sequential forward link and reverse link frames that may be continuously transmitted prior to allowing transmission of the opposite type of frame. It should be noted that the number of N and M may be vary within a given superframe or between superframes.

In both FDD and TDD systems each superframe may comprise a superframe preamble. In certain embodiments, the superframe preamble includes a pilot channel that includes pilots that may be used for channel estimation by access terminals, a broadcast channel that includes configuration information that the access terminal may utilize to demodulate the information contained in the forward link frame. Further acquisition information such as timing and other information sufficient for an access terminal to communicate on one of the carriers and basic power control or offset information may also be included in the superframe preamble. In other cases, only some of the above and/or other information may be included in this superframe preamble.

As shown in FIGS. 3A and 3B, the superframe preamble is followed by a sequence of frames. Each frame may consist of a same or a different number of OFDM symbols, which may constitute a number of subcarriers that may simultaneously utilized for transmission over some defined period. Further, each frame may operate according to a symbol rate hopping mode, where one or more non-contiguous OFDM symbols are assigned to a user on a forward link or reverse link, or a block hopping mode, where users hop within a block of OFDM symbols. The actual blocks or OFDM symbols may or may not hop between frames.

Figure 4:
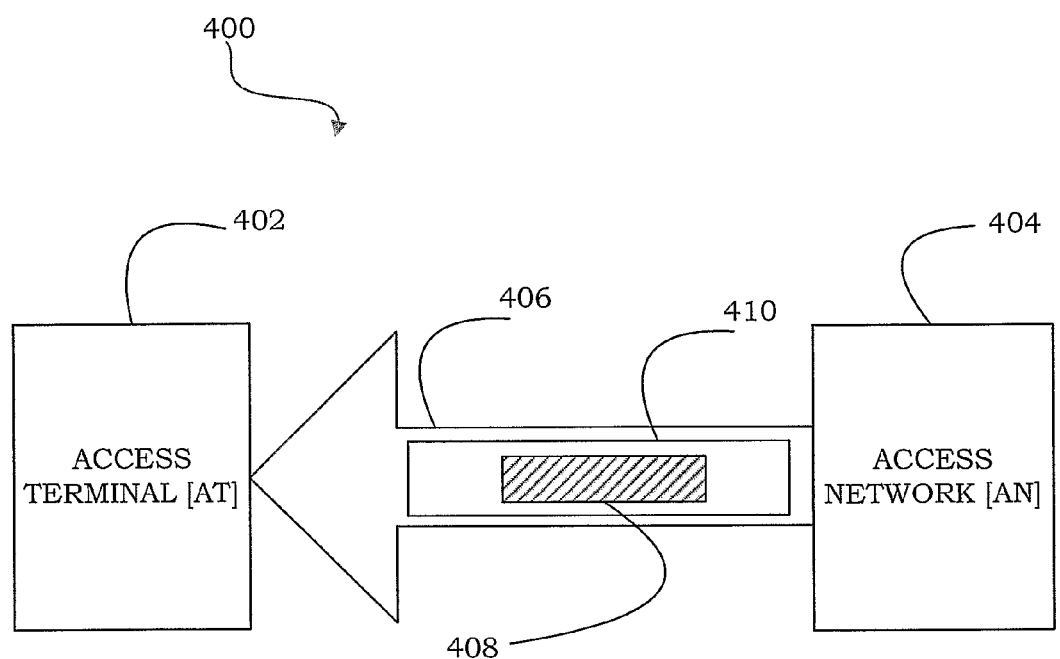
FIG. 4 illustrate embodiment of a communication between an access terminal and an access network.

FIG. 4 illustrates communication between an access terminal 402 and an access network 404 according to an embodiment. Using a communication link 406 and based upon predetermined timing, system conditions, or other decision criteria, the access network 404 will make a request to the access terminal 402 to provide PilotReport. The communication link may be implemented using communication protocols/standards such as World Interoperability for Microwave Access (WiMAX), infrared protocols such as Infrared Data Association (IrDA), short-range wireless protocols/technologies, Bluetooth® technology, ZigBee® protocol, ultra wide band (UWB) protocol, home radio frequency (HomeRF), shared wireless access protocol (SWAP), wideband technology such as a wireless Ethernet compatibility alliance (WECA), wireless fidelity alliance (Wi-Fi Alliance), 802.11 network technology, public switched telephone network technology, public heterogeneous communications network technology such as the Internet, private wireless communications network, land mobile radio network, code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple (OFDM), orthogonal frequency division multiple access (OFDMA), orthogonal frequency division multiple FLASH (OFDM-FLASH), global system for mobile communications (GSM), single carrier (1X) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

The access terminal 402 is configured to receive a PilotReportRequest message from the access network 404. The access network 404 is configured to transmit a PilotReportRequest message 408 to the access terminal 402 using the communication link 406. The PilotReportRequest message 408 comprises a MessageID field and a ReportFormat field. In an embodiment, 8 bits may be used for MessageID field and 8 bits may be used for ReportFormat field. Generally, a message data structure is used to store the PilotReportRequest message in memory, wherein the data structure is limited to use 8 bits to store the MessageID field and 8 bits to store the ReportFormat.

The access network 404 generates the PilotReportRequest message 408 by setting the values for MessageID and the ReportFormat field. For example, the ReportFormat field indicates the format of the PilotReport being requested from the access terminal. The access network 404 may incorporate the PilotReportRequest message 408 into a data packet 410. In another embodiment, the PilotReportRequest message 408 may be transmitted without being incorporated in to a packet. For example, the data packet comprises header information that indicates whether that data packet 410 contains the PilotReportRequest message 408. The data packet 410 is transmitted on the forward link 406 using one or more channels. In an embodiment, the access network 404 may use a channel, of the communication link 406 to transmit the PilotReportRequest message 408.

The access terminal 402 is configured to receive data packets on the communication link 406, one of which may comprise the PilotReportRequest message 408. Various methods may be used to extract the PilotReportRequest message 408 from the forward link. For example, once the access terminal 402 has extracted the data packet 410 from one of the channels of the forward link, the access terminal 402 may check the header information of the data packet 410 to determine if the data packet 410 comprises the PilotReportRequest message 408. If so, then the access network 404 extracts the designated 8 bits for MessageID and 8 bits for ReportFormat and stores the values in memory (such as the memory 272 of FIG. 2).

Figure 5:
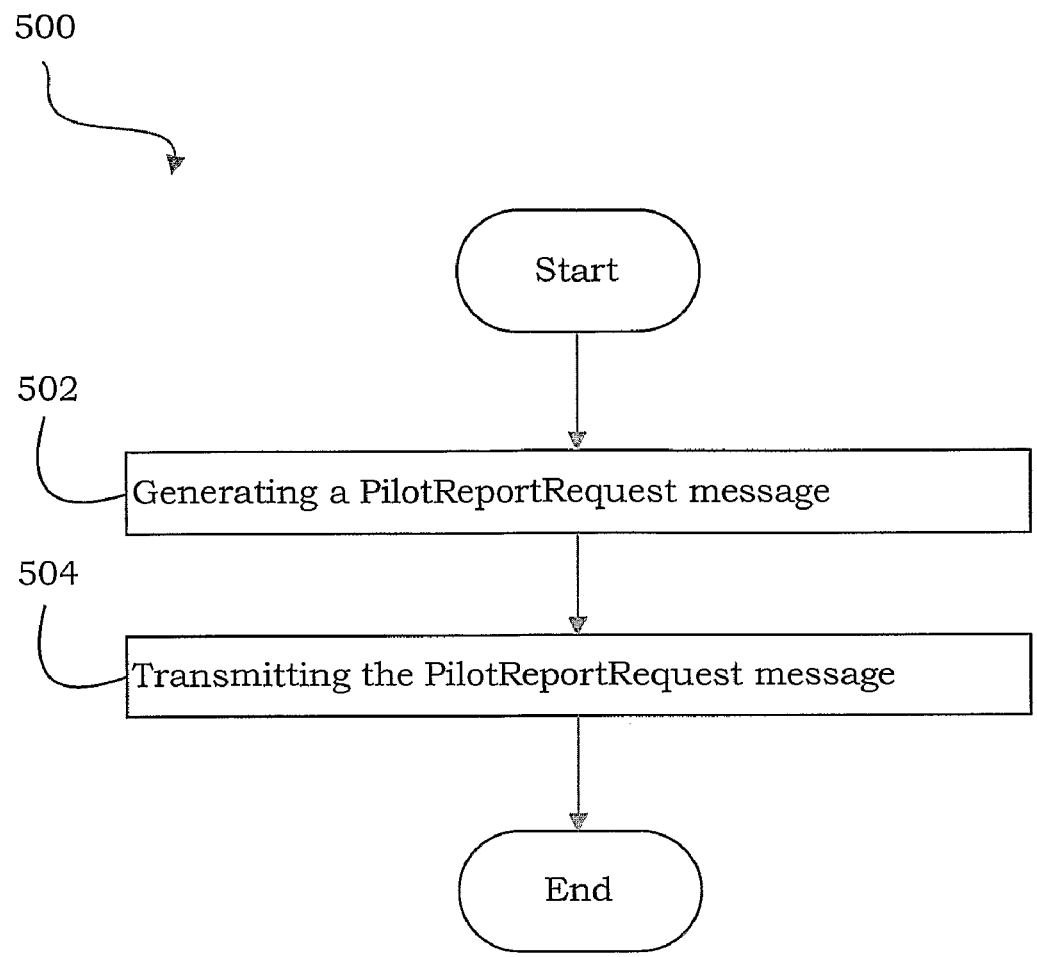
FIG. 5A illustrates a flow diagram of a process used by access network.
FIG. 5B illustrates one or more processors for transmitting a PilotReportRequest message.
Figure 5:
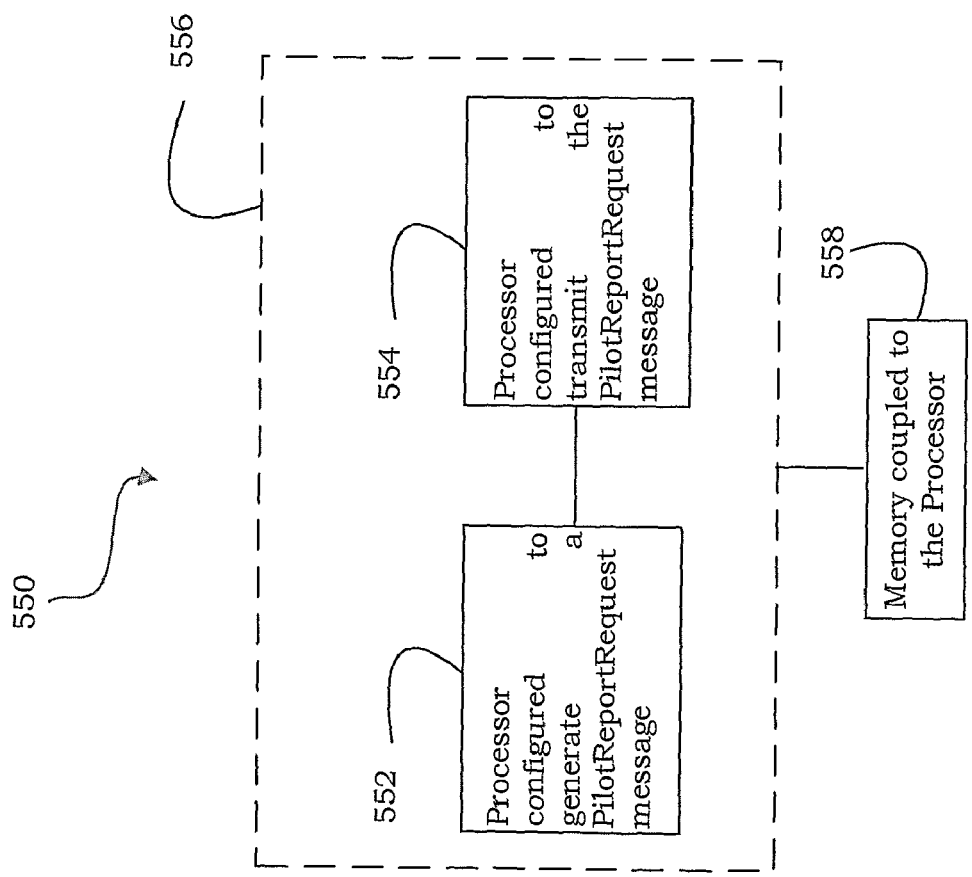

FIG. 5A illustrates a flow diagram of process 500, according to an embodiment. The access network 404 may utilize one or more processors to execute the process 500. At 502, a PilotReportRequest message is generated comprising an 8 bit MessageID field and an 8 bit ReportFormat field, wherein the ReportFormat field indicates the format of the PilotReport being requested from the access terminal and at 504, the PilotReportRequest message is transmitted over a communication link.

FIG. 5B illustrates a processor 550 to generate and transmit the PilotReportRequest message. The processor referred to may be electronic devices and may comprise one or more processors configured to transmit the PilotReportRequest message. Processor 552 is configured to generate a PilotReportRequest message comprising an 8 bit MessageID field and an 8 bit ReportFormat field, wherein the ReportFormat field indicates the format of the PilotReport being requested from the access terminal. Processor 554 is configured to transmit the PilotReportRequest message over a communication link. The functionality of the discrete processors 552 to 554 depicted in the figure may be combined into a single processor 556. A memory 558 is also coupled to the processor 556.

In an embodiment, an apparatus comprises means for generating a PilotReportRequest message having an 8 bit MessageID field and an 8 bit ReportFormat field wherein the ReportFormat field indicates the format of the PilotReport being requested from an access terminal. The apparatus further comprises means for transmitting the PilotReportRequest message over a communication link. The means described herein may comprise one or more processors.

Figure 6:
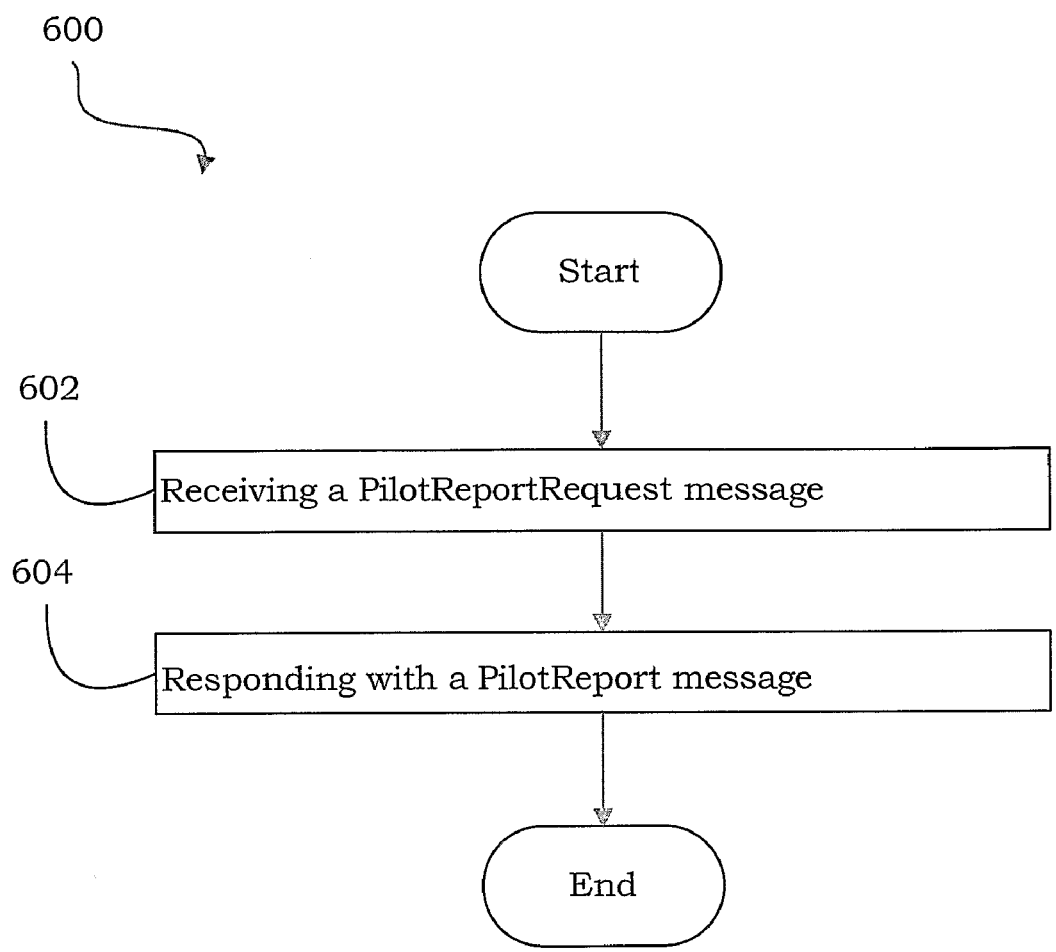
FIG. 6A illustrates a flow diagram of a process used by access terminal.
FIG. 6B illustrates one or more processors for receiving a PilotReportRequest message.
Figure 6:
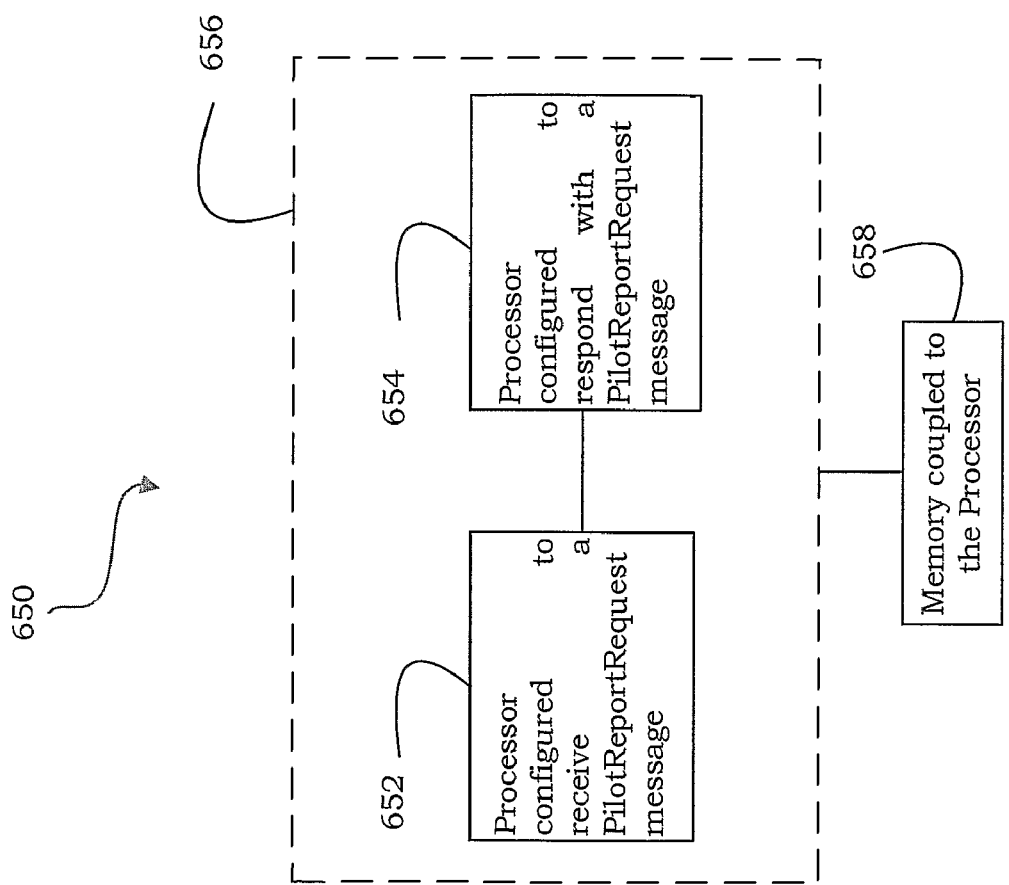

FIG. 6A illustrates a flow diagram of process 600, according to an embodiment. At 602, a PilotReportRequest message is received comprising an 8 bit MessageID field and an 8 bit ReportFormat field wherein the ReportFormat field indicates the format of the PilotReport being requested from an access terminal and at 604, a PilotReport message is responded with.

FIG. 6B illustrates processor 650 for receiving a PilotReportRequest message. The processor referred to may be electronic devices and may comprise one or more processors configured to receive the PilotReportRequest message. Processor 652 is configured to receive a PilotReportRequest message comprising an 8 bit MessageID field and an 8 bit ReportFormat field wherein the ReportFormat field indicates the format of the PilotReport being requested from an access terminal and Processor 654 is configured to respond with a PilotReport message. The functionality of the discrete processors 652 to 654 depicted in the figure may be combined into a single processor 656. A memory 658 is also coupled to the processor 656.

In an embodiment, an apparatus comprises means for receiving a PilotReportRequest message having an 8 bit MessageID field and an 8 bit ReportFormat field wherein the ReportFormat field indicates the format of the PilotReport being requested from an access terminal. The apparatus further comprises means for responding with a PilotReport message. The means described herein may comprise one or more processors.

Various modifications to these embodiments will be readily apparent to those skilled in the art, and the generic principles defined herein may be applied to other embodiments. Thus, the description is not intended to be limited to the embodiments shown herein but is to be accorded the widest scope consistent with the principles and novel features disclosed herein.

We claim:

1. A method of transmitting PilotReportRequest message in a wireless communication system, characterized in that:
   generating a PilotReportRequest message comprising an 8 bit MessageID field and an 8 bit ReportFormat field wherein the ReportFormat field indicates the format of the PilotReport being requested from an access terminal; and
   transmitting the PilotReportRequest message over a communication link.

2. A non-transitory computer storage readable medium including instruction stored thereon, characterized in that:
   a first set of instructions for generating a PilotReportRequest message comprising an 8 bit MessageID field and an 8 bit ReportFormat field wherein the ReportFormat field indicates the format of the PilotReport being requested from an access terminal; and
   a second set of instructions for transmitting the PilotReportRequest message over a communication link.

3. An apparatus operable in a wireless communication system, characterized in that:
   means for generating a PilotReportRequest message comprising an 8 bit MessageID field, an 8 bit ReportFormat field wherein the ReportFormat field indicates the format of the PilotReport being requested from an access terminal; and
   means for transmitting the PilotReportRequest message over a communication link.

4. A method of receiving PilotReportRequest message in a wireless communication system, characterized in that:
   receiving a PilotReportRequest message comprising an 8 bit MessageID field and an 8 bit ReportFormat field wherein the ReportFormat field indicates the format of the PilotReport being requested from an access terminal; and
   responding with a PilotReport message.

5. A non-transitory computer storage readable medium including instruction stored thereon, characterized in that:
   a first set of instructions for receiving a PilotReportRequest message comprising an 8 bit MessageID field, an 8 bit ReportFormat field wherein the ReportFormat field indicates the format of the PilotReport being requested from an access terminal; and
   a second set of instructions for responding with a PilotReport message.

6. An apparatus operable in a wireless communication system, characterized in that:
   means for receiving a PilotReportRequest message comprising an 8 bit MessageID field, an 8 bit ReportFormat field wherein the ReportFormat field indicates the format of the PilotReport being requested from an access terminal; and
   means for responding with a PilotReport message.

* * * * *